US012775983B2

(12) United States Patent
Padgett

(10) Patent No.: US 12,775,983 B2
(45) Date of Patent: Oct. 27, 2026

(54) ATM HAVING SUPPORT FOR FOREIGN CURRENCY

(71) Applicant: Truist Bank, Charlotte, NC (US)

(72) Inventor: Karie Padgett, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 97 days.

(21) Appl. No.: 18/621,400

(22) Filed: Mar. 29, 2024

(65) Prior Publication Data

US 2025/0307922 A1 Oct. 2, 2025

(51) Int. Cl.

| | |
|---|---|
| ***G06Q 40/04*** | (2012.01) |
| ***G06Q 20/38*** | (2012.01) |
| ***G07F 19/00*** | (2006.01) |

(52) U.S. Cl.

CPC ........... *G06Q 40/04* (2013.01); *G06Q 20/381* (2013.01); *G07F 19/00* (2013.01); *G07F 19/20* (2013.01); *G07F 19/202* (2013.01)

(58) Field of Classification Search

CPC ...... G06Q 40/04; G06Q 20/381; G07F 19/00; G07F 19/20; G07F 19/202

See application file for complete search history.

(56) References Cited

U.S. PATENT DOCUMENTS

| | | | | |
|---|---|---|---|---|
| 5,729,623 | A * | 3/1998 | Omatu | G07D 7/121 382/136 |
| 6,128,402 | A * | 10/2000 | Jones | G07D 7/20 382/135 |
| 2008/0301047 | A1 * | 12/2008 | Fish | G06Q 20/105 705/41 |
| 2016/0247136 | A1 * | 8/2016 | Mendoza | G07G 1/0036 |
| 2016/0350995 | A1 * | 12/2016 | Mizuno | G07D 7/003 |
| 2020/0019776 | A1 * | 1/2020 | Lewis | G06N 3/0464 |
| 2021/0264711 | A1 * | 8/2021 | Steinlin | G06N 3/0464 |

FOREIGN PATENT DOCUMENTS

| | | | | |
|---|---|---|---|---|
| WO | WO-2016093440 A1 * | 6/2016 | | G07D 7/12 |

* cited by examiner

*Primary Examiner* — Elda G Milef

(74) *Attorney, Agent, or Firm* — Jordan IP Law LLC; Michael A. Springs, Esq.

(57) ABSTRACT

A computing device, a computer program product, and a computer-implemented method for facilitating, in real time at an ATM, a deposit of foreign currency into a financial account that is based on local or native currency.

19 Claims, 9 Drawing Sheets

ATM HAVING SUPPORT FOR FOREIGN CURRENCY

TECHNICAL FIELD

The present disclosure relates to a computing device, computer program product, and computer-implemented method for implementing an automated teller machine (ATM) and, more particularly, for an ATM that facilitates in real time, a deposit of foreign currency or banknotes into a financial account that is based on local or native currency.

BACKGROUND

Financial institutions administer ATMs in many foreign countries. ATMs generally permit a user to conduct financial transactions (e.g., deposits, withdrawals, etc.) using local currency, i.e., the currency that is domestic to the location of the ATM.

What is needed is an ATM that can enable a user to conduct financial transactions using foreign currency that is not native to the location of the ATM.

SUMMARY

The present disclosure relates to a computing device, a computer program product, and a computer-implemented method for delivering an enhanced ATM which facilitates financial transactions (e.g., deposits) of foreign currency which is foreign to where the ATM is located.

In accordance with one or more embodiments set forth, illustrated, and described herein, an apparatus may comprises one or more of the following: one or more processors; and a non-transitory memory coupled to the one or more processors, the non-transitory memory including a set of instructions of computer-executable program code, which when executed by the one or more processors, cause the apparatus to: cause, in response to receipt of a banknote (e.g., at a currency/banknote acceptor) during an interactive session between an ATM and a user having a native financial account, capture of one or more images of at least one surface of the banknote; execute analysis of the image data; identify, based on the analysis, currency type (i.e., native currency and foreign currency) of the banknote; convert, when the identified currency type is a foreign currency type, the foreign currency type to a native currency type associated with the native financial account based on a current exchange rate of the foreign currency type; and cause, in response to the conversion, a credit to the native financial account.

In accordance with one or more embodiments set forth, illustrated, and described herein, an apparatus may comprises one or more of the following: one or more processors; and a non-transitory memory coupled to the one or more processors, the non-transitory memory including a set of instructions of computer-executable program code, which when executed by the one or more processors, cause the apparatus to: cause, in response to receipt of a banknote (e.g., at a currency/banknote acceptor) during an interactive session between an ATM and a user having a native financial account, capture (as image data) one or more images of at least one surface of the banknote; conduct image analysis of the image data; identify, based on the analysis, a foreign currency type of the banknote; convert, based on a current exchange rate of the foreign currency type, the identified foreign currency type to a native currency type associated with the native financial account; and cause, in response to the conversion, a credit to the native financial account.

In accordance with one or more embodiments set forth, illustrated, and described herein, an apparatus may comprises one or more of the following: one or more processors; and a non-transitory memory coupled to the one or more processors, the non-transitory memory including a set of instructions of computer-executable program code, which when executed by the one or more processors, cause the apparatus to: cause, in response to receipt of a banknote (e.g., at a currency/banknote acceptor) during an interactive session between an ATM and a user having a native financial account, capture of one or more images of at least one surface of the banknote; identify, in response to the captured one or more images, a foreign currency type of the banknote; and cause, in response to the identification, a credit to the native financial account based on a current exchange rate of the foreign currency type to a native currency type associated with the native financial account.

In accordance with each respective apparatus, the banknote includes a plurality of banknotes of a different foreign currency types.

In accordance with each respective apparatus, the set of instructions, when executed by the one or more processors, cause the apparatus to identify the foreign currency type of each banknote in the plurality of banknotes.

In accordance with each respective apparatus, the set of instructions, when executed by the one or more processors, cause the apparatus to cause, in response to the identification, a credit to the native financial account based on a current exchange rate of each foreign currency type to a native currency type associated with the native financial account.

In accordance with each respective apparatus, the set of instructions, when executed by the one or more processors, causes the apparatus to cause a display of an itemization of the deposited banknotes, the identified foreign currency type, and the value in the identified foreign currency type based on the current exchange rate.

In accordance with each respective apparatus, executing the image analysis of the captured image data comprises executing a comparison of the captured image data with stored reference image data.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause, in response to receipt of a banknote (e.g., at a currency/banknote acceptor) during an interactive session between an ATM and a user having a native financial account, capture of one or more images of at least one surface of the banknote; execute analysis of the image data; identify, based on the analysis, a currency type of the banknote; convert, when the identified currency type is a foreign currency type, the foreign currency type to a native currency type associated with the native financial account based on a current exchange rate of the foreign currency type; and cause, in response to the conversion, a credit to the native financial account.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause, in response to receipt of a banknote (e.g., at a currency/banknote acceptor) during an interactive session between an ATM and a user having a native financial account, capture of one or more images of at least one surface of the banknote; execute analysis of the image data; identify, based on the analysis, a foreign currency type of the banknote; convert, based on a current exchange rate of the foreign currency type, the identified foreign currency type to a native currency type associated with the native financial account; and cause, in response to the conversion, a credit to the native financial account.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to execute one or more of the following: cause, in response to receipt of a banknote (e.g., at a currency/banknote acceptor) during an interactive session between an ATM and a user having a native financial account, capture of one or more images of at least one surface of the banknote; identify, in response to the captured one or more images, a foreign currency type of the banknote; and cause, in response to the identification, a credit to the native financial account based on a current exchange rate of the foreign currency type to a native currency type associated with the native financial account.

In accordance with each respective computer program product, the banknote includes a plurality of banknotes of different foreign currency types.

In accordance with each respective computer program product, the set of instructions, when executed by the one or more processors, cause the computing device to identify the foreign currency type of each banknote in the plurality of banknotes.

In accordance with each respective computer program product, the set of instructions, when executed by the one or more processors, cause the computing device to cause, in response to the identification, a credit to the native financial account based on a current exchange rate of each foreign currency type to a native currency type associated with the native financial account.

In accordance with each respective computer program product, the set of instructions, when executed by the one or more processors, causes the computing device to cause a display of an itemization of the banknotes deposited, the identified foreign currency type, and the value in the identified foreign currency type based on the current exchange rate.

In accordance with each respective computer program product, executing the image analysis of the captured image data comprises executing a comparison of the captured image data with stored reference image data.

In accordance with one or more embodiments set forth, illustrated, and described herein, a computer-implemented method comprises one or more of the following: causing, by a computing device in response to receipt of a banknote (e.g., at a currency/banknote acceptor) during an interactive session between an ATM and a user having a native financial account, capture of one or more images of at least one surface of the banknote; execute analysis of the image data; identifying, by the computing device based on the analysis, a currency type of the banknote; converting, by the computing device when the identified currency type is a foreign currency type, the foreign currency type to a native currency type associated with the native financial account based on a current exchange rate of the foreign currency type; and causing, by the computing device in response to the conversion, a credit to the native financial account.

In accordance with one or more embodiments set forth, illustrated, and described herein, a computer-implemented method comprises one or more of the following: causing, by a computing device in response to receipt of a banknote (e.g., at a currency/banknote acceptor) during an interactive session between an ATM and a user having a native financial account, capture of one or more images of at least one surface of the banknote; executing, by the computing device, analysis of the image data; identifying, by the computing device based on the analysis, a foreign currency type of the banknote; converting, by the computing device based on a current exchange rate of the foreign currency type, the identified foreign currency type to a native currency type associated with the native financial account; and causing, by the computing device in response to the conversion, a credit to the native financial account.

In accordance with one or more embodiments set forth, illustrated, and described herein, a computer-implemented method comprises one or more of the following: causing, by a computing device in response to receipt of a banknote (e.g., at a currency/banknote acceptor) during an interactive session between an ATM and a user having a native financial account, capture of one or more images of at least one surface of the banknote; identifying, by the computing device in response to the captured one or more images, a foreign currency type of the banknote; and causing, by the computing device in response to the identification, a credit to the native financial account based on a current exchange rate of the foreign currency type to a native currency type associated with the native financial account.

In accordance with each respective computer-implemented method, the banknote includes a plurality of banknotes of different foreign currency types.

In accordance with each respective computer-implemented method, identifying the foreign currency type comprises identifying the foreign currency type of each banknote in the plurality of banknotes.

In accordance with each respective computer-implemented method, causing a credit to the native financial account comprises causing a credit to the native financial account based on a current exchange rate of each foreign currency type to a native currency type associated with the native financial account.

In accordance with each respective computer-implemented method, further comprising causing, by the computing device, a display of an itemization of the banknotes deposited, the identified foreign currency type, and the value in the identified foreign currency type based on the current exchange rate.

In accordance with each respective computer-implemented method, executing the image analysis of the captured image data comprises executing a comparison of the captured image data with stored reference image data.

DRAWINGS

The various advantages of the exemplary embodiments will become apparent to one skilled in the art by reading the following specification and appended claims, and by referencing the following drawings, in which:

Figure 4:
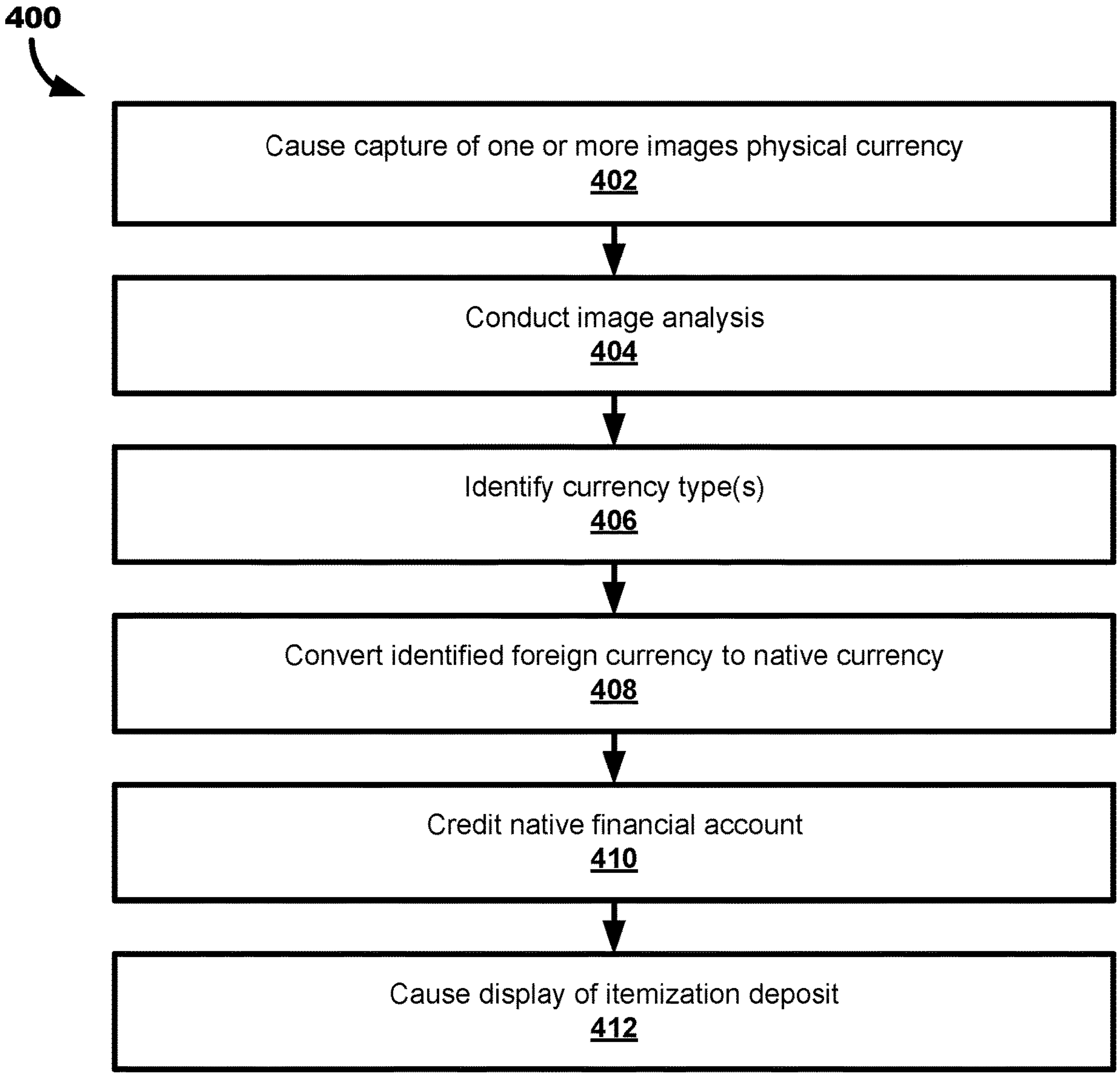
Figure 5:
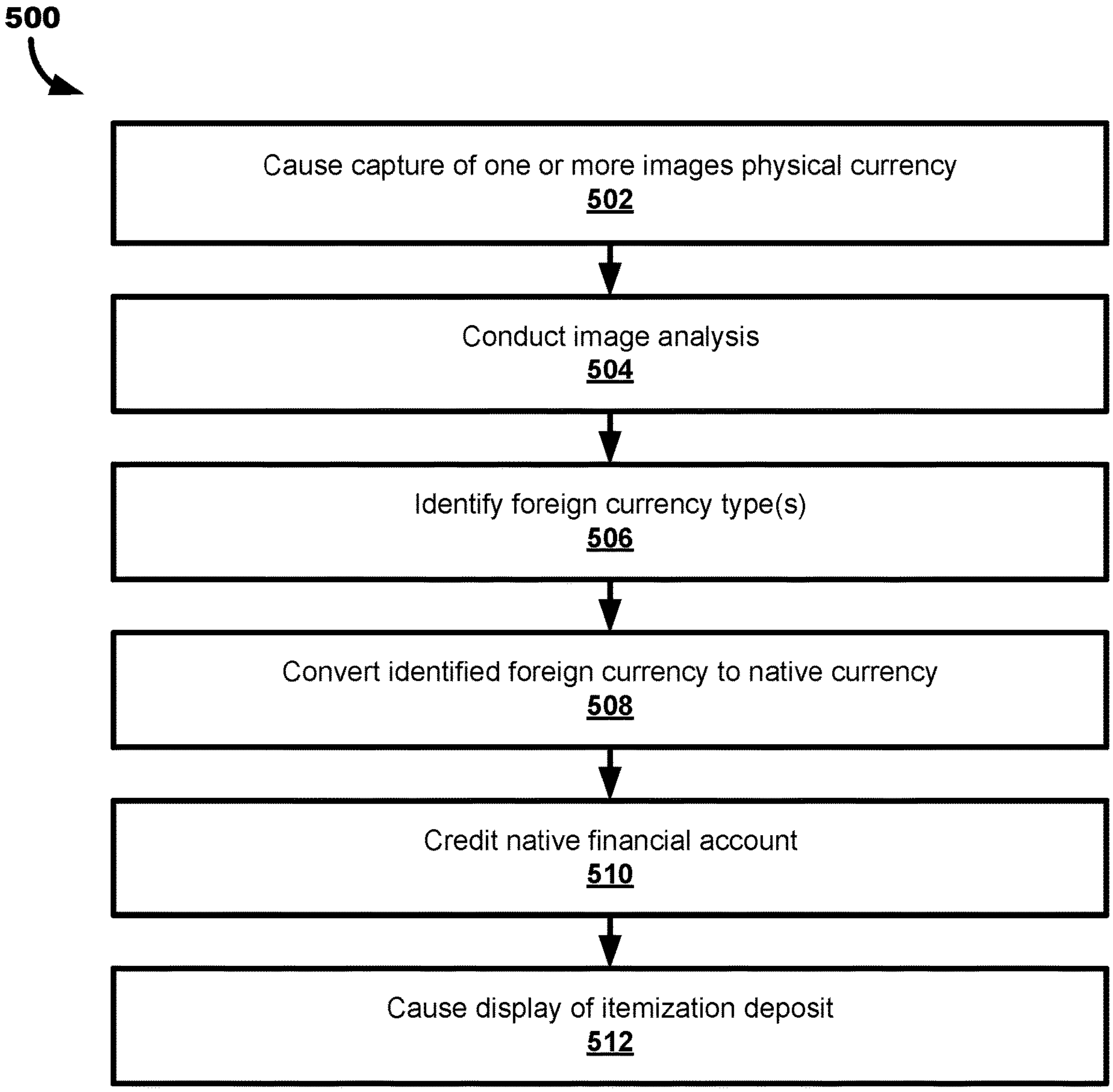
Figure 6:
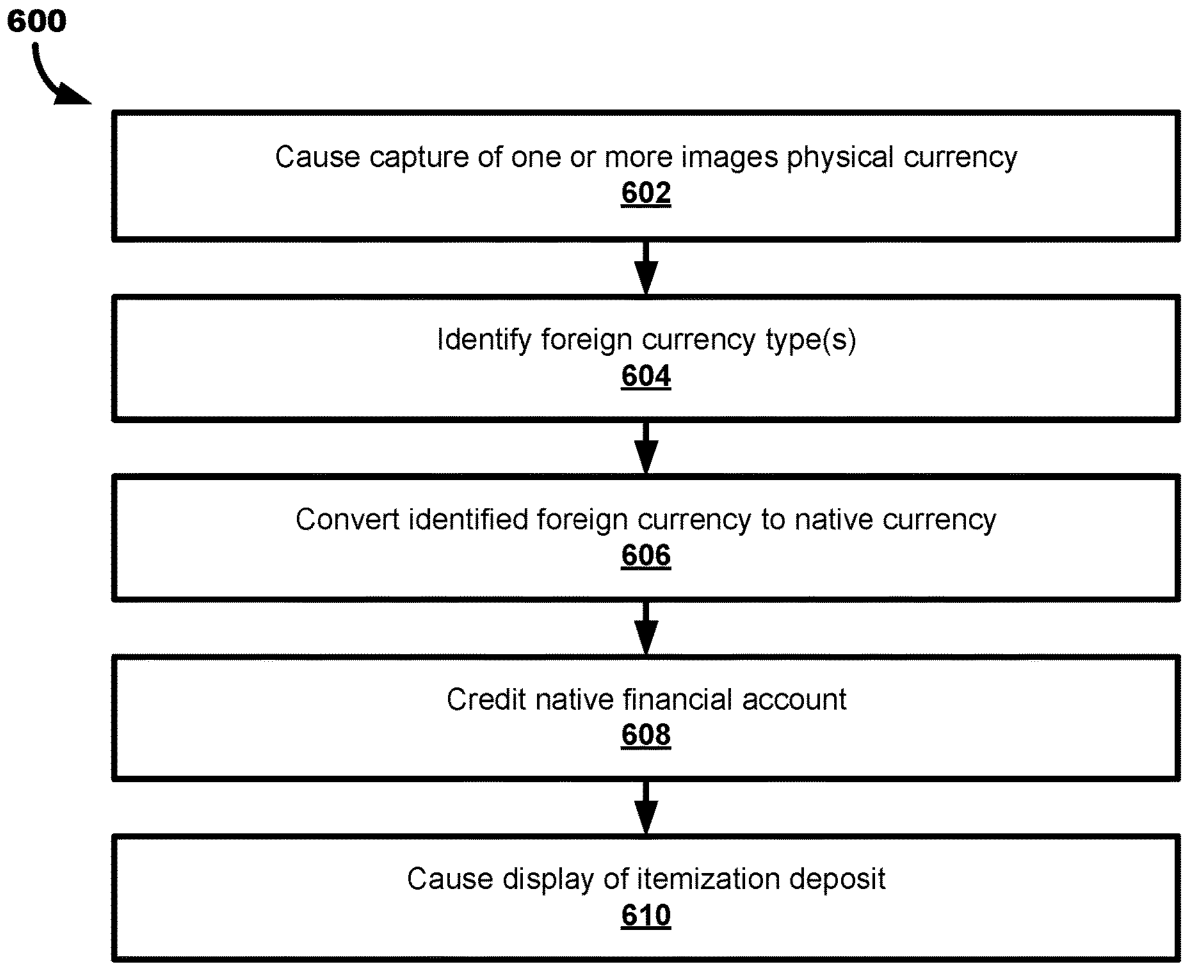

FIGS. 4 through 6 respectively illustrates computer-implemented methods, in accordance with one or more embodiments set forth and described herein.

Figure 7:
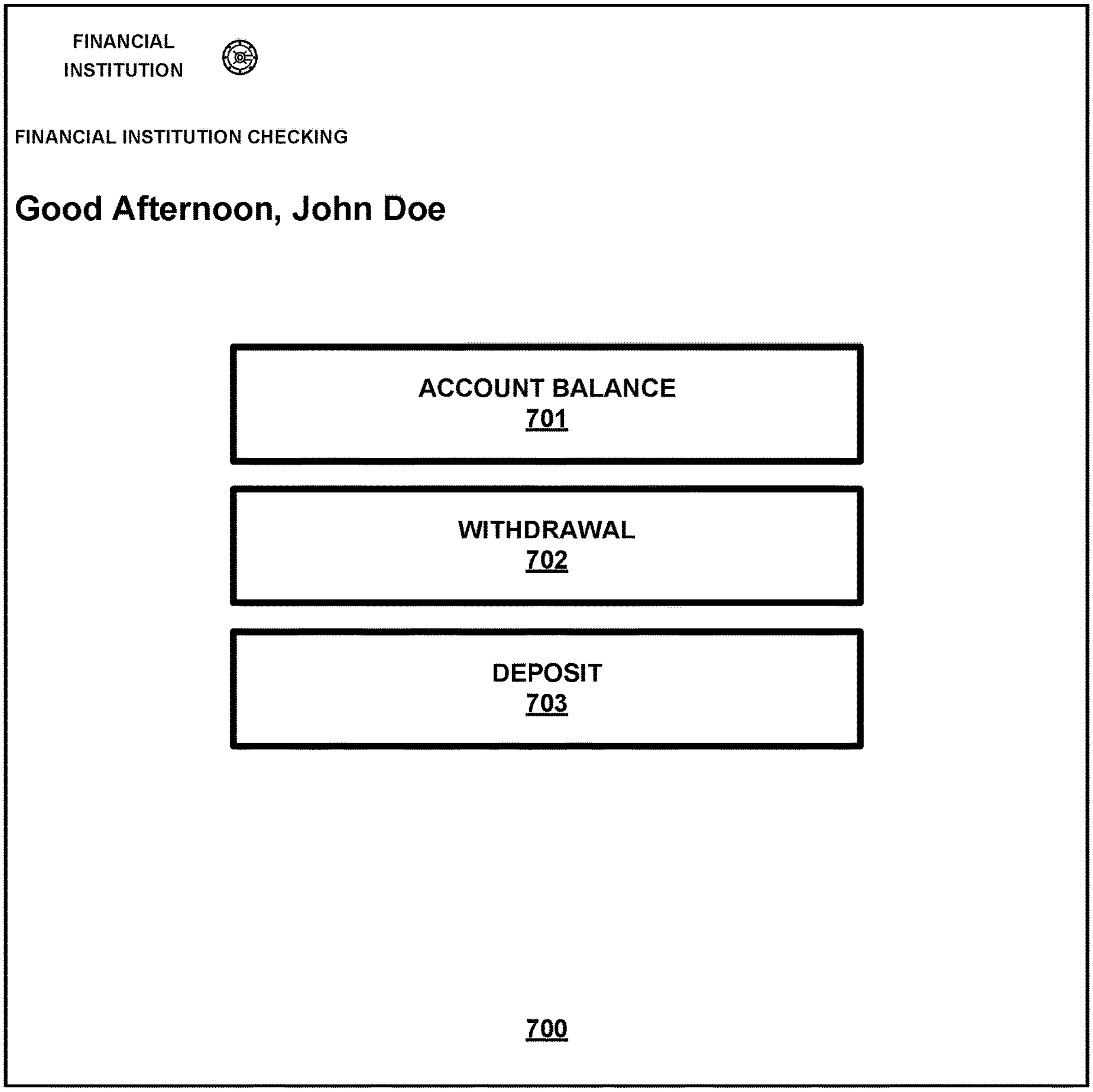
Figure 8:
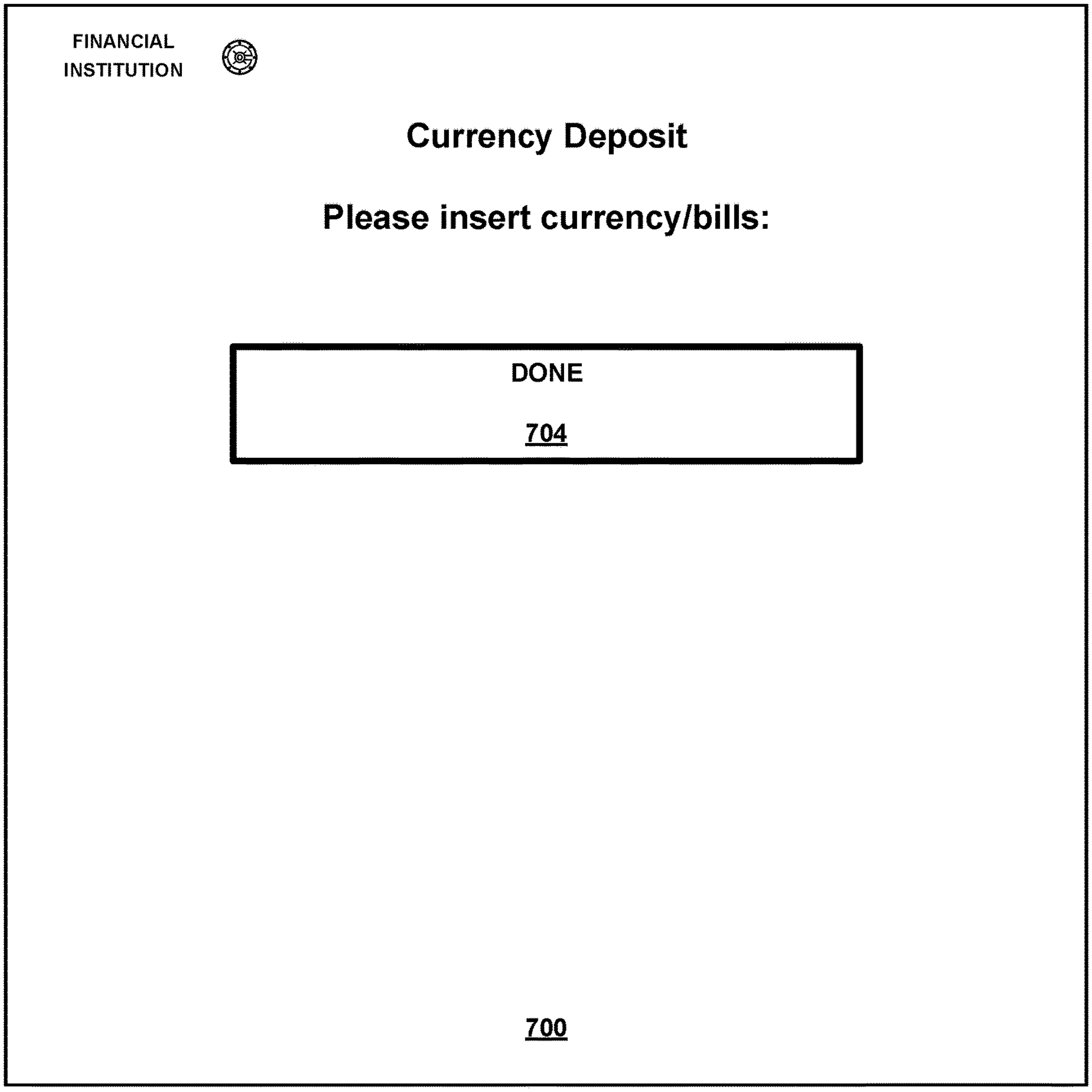
Figure 9:
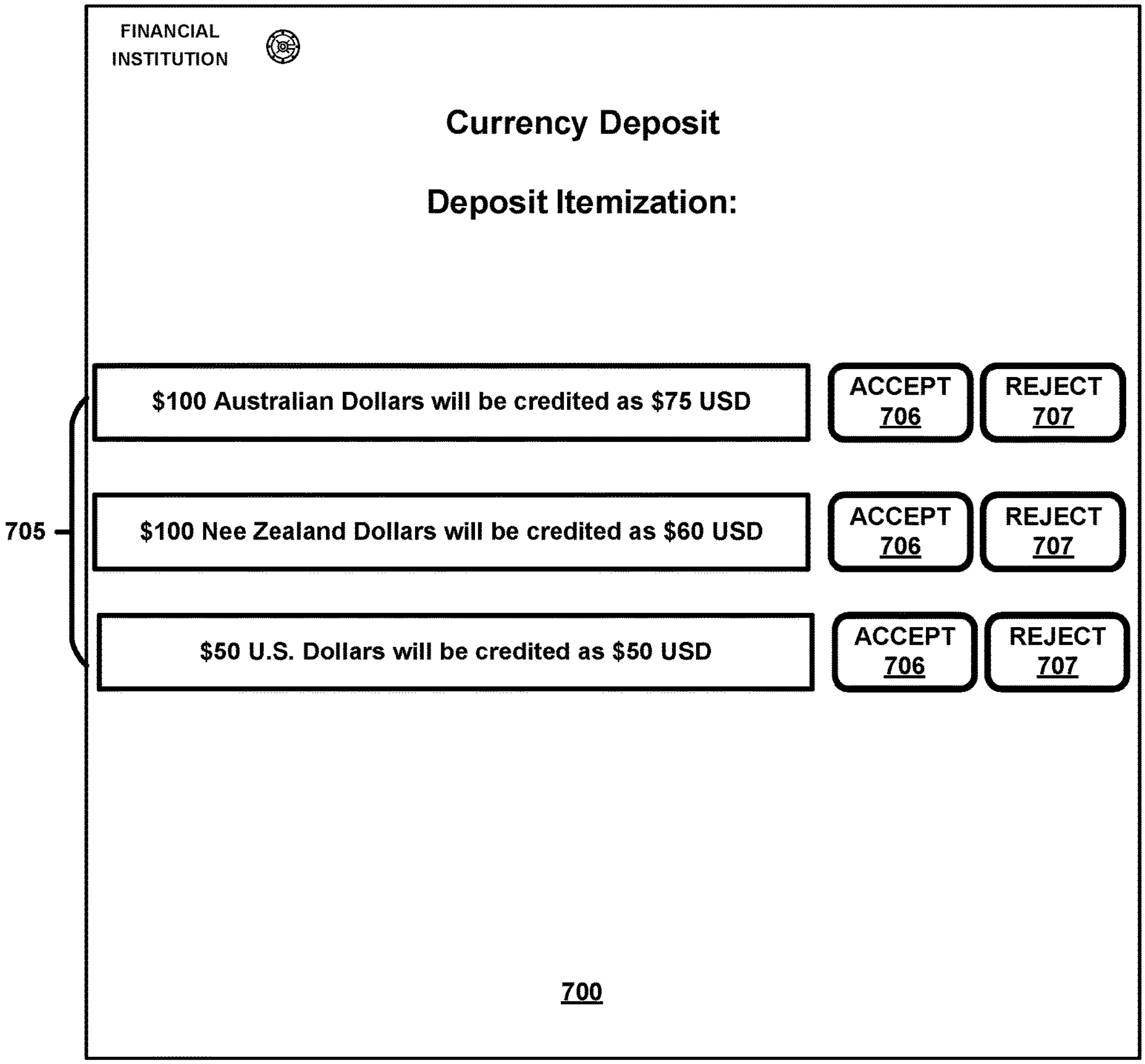

FIG. 7 illustrates an initial interactive session between a user and an ATM, in accordance with one or more embodiments set forth and described herein;

FIG. 8 illustrates an interactive session between a user and an ATM enabling deposit of currency, in accordance with one or more embodiments set forth and described herein;

FIG. 9 illustrates an interactive session between a user and an ATM, in accordance with one or more embodiments set forth and described herein.

DESCRIPTION

Herein-below are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "engines" relates to either software engines (e.g., code embodied on a machine-readable medium or in a transmission signal) or hardware engines. Certain embodiments are described herein as including logic or a number of components, engines, or mechanisms. A "hardware engine" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein. In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as an FPGA or an ASIC. A hardware engine may also include programmable logic or circuitry that is temporarily configured by software to perform certain operations. A hardware engine may include software encompassed within a general-purpose processor or other programmable processor. It will be appreciated that the decision to implement a hardware engine mechanically, in dedicated and permanently configured circuitry, or in temporarily configured circuitry (e.g., configured by software) may be driven by cost and time considerations. Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software may accordingly configure a processor, for example, to constitute a particular hardware engine at one instance of time and to constitute a different hardware engine at a different instance of time. Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented engine" relates to a hardware engine implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

As used herein, "server" relates to a server computer or group of computers that acts to provide a service for a certain function or access to a network resource. A server may be a physical server, a hosted server in a virtual environment, or software code executing on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, engine, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a virtual chat communication platform is provided for a client device of a user having one or more financial accounts residing at one or more financial institution servers of a financial institution. The virtual chat communication platform enables a single user, using a single client device, to participate in multiple simultaneous virtual chat communication sessions with virtual support agents acting on behalf of the financial institution in support of serving the needs of the user. In that way, the user is not forced to cancel or end a first virtual chat communication session in order to commence two or more additional virtual chat communication sessions using the same client device.

Figure 1:
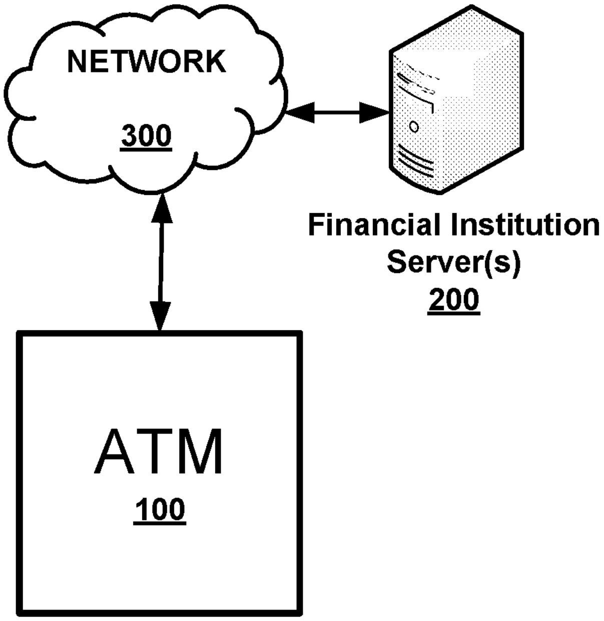
FIG. 1 illustrates a communication environment for an ATM, in accordance with one or more embodiments set forth and described herein.

Turning to the figures, in which FIG. 1 illustrates a network communication environment that facilitates communications between an ATM 100 and one or more financial institution servers 200. The ATM 100 used by a user (e.g., a financial account holder using native financial currency) operating in the network communication environment facilitates user access to and user management of one or more financial accounts residing at the one or more financial institution servers 200. The communication environment includes the ATM 100, the one or more financial institution servers 200, and a communication network 300 through which communication is facilitated between the ATM 100 and the one or more financial institution servers 200.

In accordance with one or more embodiments set forth, described, and/or illustrated herein, the ATM 100 comprises any computing device including input/output devices (keypad, touch screen, buttons, etc.) in order to facilitate interaction between a user and the ATM 100. This disclosure contemplates the ATM 100 comprising any suitable form of electronic device that optimizes or otherwise transforms the performance and functionality of the one or more embodiments in a manner that falls within the spirit and scope of the principles of this disclosure.

Figure 2:
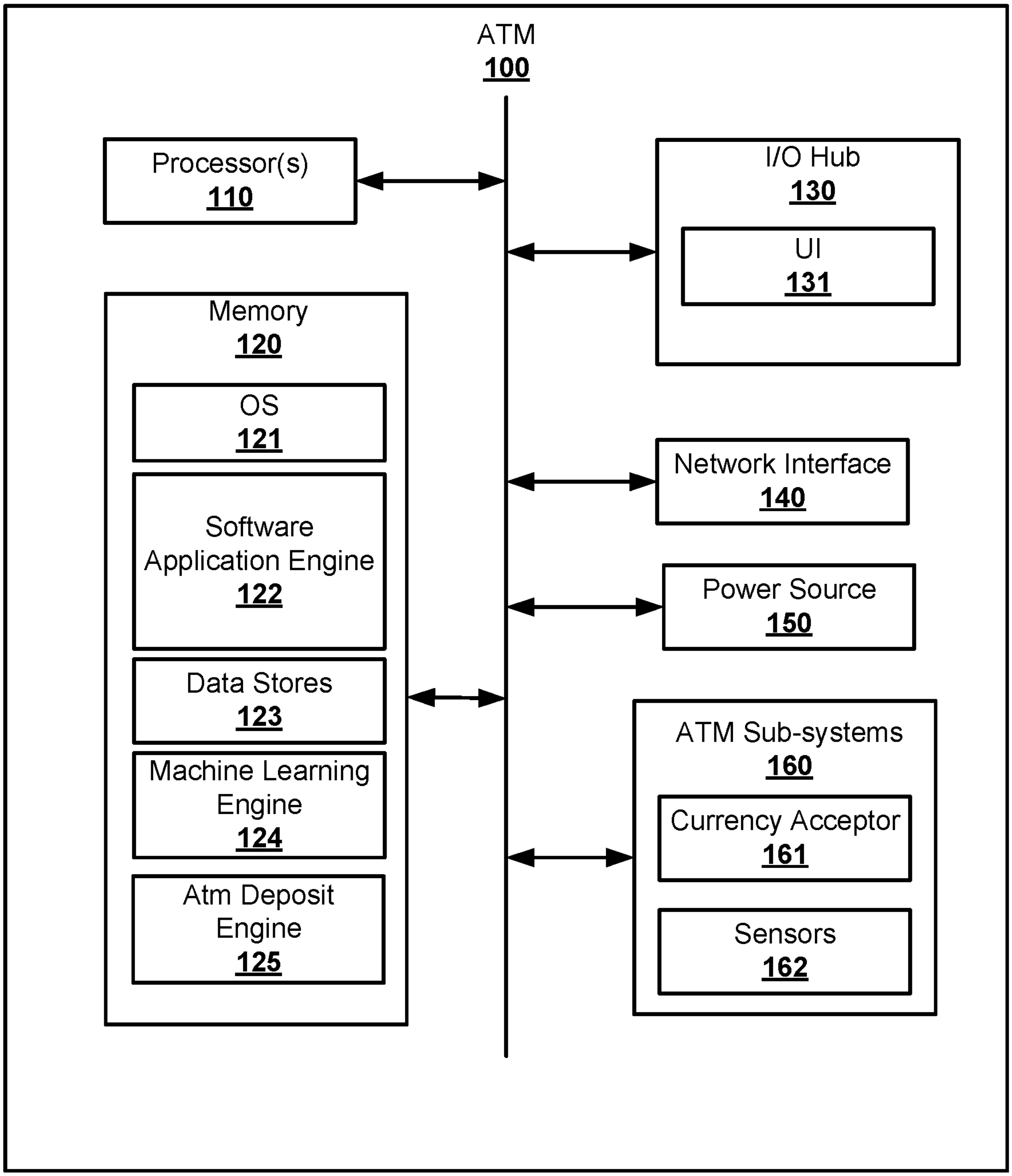
FIG. 2 illustrates a block diagram of the ATM device of FIG. 1.

In the illustrated example embodiment of FIG. 1, some of the possible operational elements of the ATM 100 are illustrated in FIG. 2 and will now be described herein. It will be understood that it is not necessary for the ATM 100 to have all the elements illustrated in FIG. 2. For example, the ATM 100 may have any combination of the various elements illustrated in FIG. 2. Moreover, the ATM 100 may have additional elements to those illustrated in FIG. 2.

The ATM 100 includes one or more processors 110, a non-transitory memory 120 operatively coupled to the one or more processors **110*a*, an I/O hub 130, a network interface 140, a power source 150, and one or more ATM subsystems 160**.

The memory 120 comprises a set of instructions of computer-executable program code. The set of instructions are executable by the one or more processors **110*a* to cause execution of an operating system 121 and one or more software applications of a software application engine 122 that reside in the memory 120. The one or more software applications residing in the memory 120 includes, but is not limited to, a financial institution application that is associated with the financial institution. The financial institution application comprises a mobile application or desktop application that facilitates establishment of a secure connection between the ATM 100 and the one or more financial institution servers 200. The one or more processors 110***a* are operable to execute the mobile application or desktop application to facilitate user access to the one or more financial accounts and user management of the one or more financial accounts.

The memory 120 also includes one or more data stores 123 that are operable to store one or more types of data. The ATM 100 may include one or more interfaces that facilitate one or more systems or engines thereof to transform, manage, retrieve, modify, add, or delete, the data residing in the data stores 123. The one or more data stores 123 may comprise volatile and/or non-volatile memory. Examples of suitable data stores 123 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123 may be a component of the one or more processors 110*a* or alternatively, may be operatively connected to the one or more processors 110*a* for use thereby. As set forth, described, and/or illustrated herein, "operatively connected" may include direct or indirect connections, including connections without direct physical contact.

A machine learning engine 124 can be used to make any determination that can be performed utilizing any type of machine learning (e.g., neural network, transformer, expert system, etc.).

In accordance with one or more embodiments set forth, described, and/or illustrated herein, the ATM 100 includes an I/O hub 130*a* operatively connected to other systems and subsystems of the ATM 100. The I/O system 130*a* may include one or more of an input interface, an output interface, and a network controller to facilitate communications between the ATM 100 and the one or more financial institution servers 200. The input interface and the output interface may be integrated as a single, unitary user interface 131, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110 to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

The user interface 131 can comprises one or more input devices such as, for example, a keypad, touch-screen, keyboard, etc., that enables a user to interact with the ATM 100.

The ATM subsystems 160 includes, but is not limited to, a currency/banknote acceptor 161 and one or more sensors 162. The currency/banknote acceptor 161 comprises a slot and an electric motor to facilitate receipt of banknotes in the form of banknotes (i.e., paper, cotton, polymer, combinations thereof, etc.) during deposits made by a user.

The one or more sensors 162 are operable to, at least during a deposit of banknotes by a user, dynamically detect, determine, capture, assess, monitor, measure, quantify, and/or sense information about each banknote. As set forth, described, and/or illustrated herein, "sensor" means any apparatus, device, component and/or system that can perform one or more of detecting, determining, assessing, monitoring, measuring, quantifying, and sensing something. The one or more sensors 162 may be operable to detect, determine, capture, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process. The one or more sensors 162 may be operatively connected to the one or more processors 110, the one or more data stores 123, and/or other elements, components, modules of the ATM 100. The one or more sensors 162 may be arranged, mounted, or positioned in any suitable location with respect to the currency/banknote acceptor 161.

In accordance with one or more embodiments, the one or more sensors 162 may work independently from each other, or alternatively, may work in combination with each other. The one or more 162 may be used in any combination, and may be used redundantly to validate and enhance the accuracy of the detection.

In accordance with one or more embodiments, the one or more sensors 162 may comprise, for example, image sensors (e.g., red, green, blue/RGB camera, multi-spectral infrared/IR camera). Alternatively or additionally, the one or more sensors 162 may comprise one or more image devices such as, for example, one or more cameras. As set forth, described, and/or illustrated herein, "camera" means any apparatus, device, component, and/or system that can capture visual data. Such visual data may include one or more of video information/data and image information/data. The visual data may be in any suitable form. The one or more cameras may comprise high resolution cameras. The high resolution can refer to the pixel resolution, the spatial resolution, spectral resolution, temporal resolution, and/or radiometric resolution. Alternatively or additionally, the one or more cameras may comprise high dynamic range (HDR) cameras or infrared (IR) cameras. For example, one or more of the cameras may be spatially oriented, positioned, operable, operable, and/or arranged to detect, determine, capture, assess, monitor, measure, quantify, and/or sense visual data related to deposited banknotes by the user, and then transmit as sensor data to the one or more processors 110 and/or the one or processors 210.

In accordance with one or more embodiments, one or more of the cameras may comprise a lens and an image capture element. The image capture element may be any suitable type of image capturing device or system, including, for example, an area array sensor, a charge coupled device (CCD) sensor, a complementary metal oxide semiconductor (CMOS) sensor, a linear array sensor, and/or a CCD (monochrome). The image capture element may capture images in any suitable wavelength on the electromagnetic spectrum. The image capture element may capture color images and/or grayscale images. One or more of the cameras may be operable with zoom in and/or zoom out capabilities.

In accordance with one or more embodiments, one or more of the cameras may be located within the ATM 100. Alternatively or additionally, one or more of the cameras may be fixed in a position that does not change relative to the vehicle 100, and particularly, the currency/banknote acceptor 161. Alternatively or additionally, the one or more of the cameras may be dynamically movable so that its position can change relative to the currency/banknote acceptor 161 in a manner which facilitates the capture of visual data from different regions of the surface (e.g., front surface and/or rear surface) of each banknote. Such movement of one or more of the cameras may be achieved in any suitable manner, such as, for example, by rotation (about one or more rotational axes), by pivoting (about a pivot axis), by sliding (along an axis), and/or by extending (along an axis).

In accordance with one or more embodiments, the one or more cameras 141 (and/or the movement thereof) may be controlled by the one or more processors 110, the ATM engine 223, the sensor engine 240, and any one or more of the modules, systems, and subsystems set forth, described, and/or illustrated herein.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the ATM 100 may serve as both a component of the input interface and a component of the output interface.

The ATM 100 also includes a network interface 140 operable to facilitate connection to the network 300. The ATM 100 further includes a power source 150 that comprises a wired powered source, a wireless power source, a replaceable battery source, or a rechargeable battery source.

In accordance with one or more embodiments set forth, described, and/or illustrated herein, "processor" means any component or group of components that are operable to execute any of the processes described herein or any form of instructions to carry out such processes or cause such processes to be performed. The one or more processors may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors **110*b*** may comprise at least one hardware circuit (e.g., an integrated circuit) operable to carry out instructions contained in program code. In embodiments in which there is a plurality of processors, such processors may work independently from each other, or one or more processors may work in combination with each other.

Figure 3:
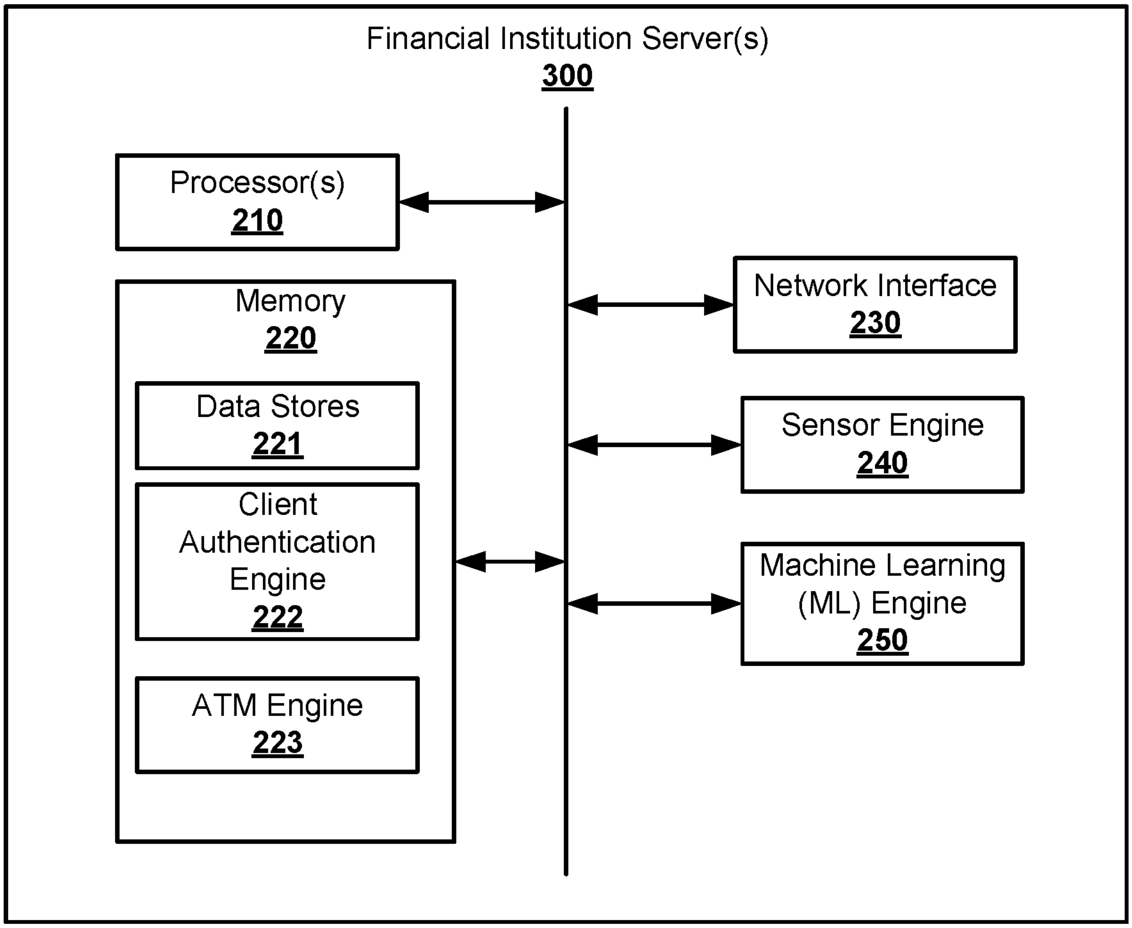
FIG. 3 illustrates a block diagram of the one or more financial institution servers of FIG. 1.

As illustrated in FIG. 3, the one or more financial institution servers 200 includes one or more processors 210, a non-transitory memory 220 operatively coupled to the one or more processors 210, a network interface 230, a sensor engine 240, and a machine learning (ML) engine 250. Some of the possible operational elements of each server in the one or more financial institution servers 200 are illustrated in FIG. 3 and will now be described herein. It will be understood that it is not necessary for each server in the one or more financial institution servers 200 to have all the elements illustrated in FIG. 3. For example, each server in the one or more financial institution servers 200 may have any combination of the various elements illustrated in FIG. 3. Moreover, each server in the one or more financial institution servers 200 may have additional elements to those illustrated in FIG. 3.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to, a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user or client authentication engine 222, a mobile financial institution application engine 223 having one or more mobile financial institution applications that reside in the memory 220, and an ATM engine 223 to facilitate financial transactions that are performed at an ATM (e.g., ATM 100). In accordance with one or more embodiments set forth, described, and/or illustrated herein, the one or more financial institution servers 200 may individually or collectively execute the instructions (which are stored) to perform any one or more of the methodologies set forth, described, and illustrated herein.

The memory 220 also includes one or more data stores 221 that are operable to store one or more types of data, including but not limited to, user account data, user authentication data, sensor data, etc. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the one or more financial institution servers 200 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The memory 220 can store computer readable program code and data which, when executed by the one or more processors 210 (or other processor) can implement (or cause to be implemented) any of the features and methodologies described herein.

The computer-executable program code may instruct the one or more processors 210 to cause the user authentication engine 221 to authenticate a user in order to gain user access to the one or more financial accounts. The user authentication engine 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application engine 222 are operable to communicate with the ATM 100 and t client device in a manner which facilitates user access to the one or more financial accounts in addition to user management of the one or more financial accounts based on successful user authentication.

The sensor engine 240 is operable, at least during execution of the mobile application or desktop application by the ATM 100, to control the one or more sensors 162.

The ML engine 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML engine 250 may analyze the received data and/or information, and transform the data and/or information in a manner which provides enhanced communication between the ATM 100 and the one or more financial institution servers 200, while also enhancing user access and management of the one or more financial accounts. The data and/or information may also be up-linked to other systems and engines in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

A user having foreign currency must generally have the foreign currency converted and exchanged to local or native currency by a financial institution or third-party. As used herein, "foreign currency" is currency that is not local or native local to the currency upon which the financial account is based. For example, foreign currency for a user having a financial account in the U.S. is any currency that is not US dollars (USD).

In accordance with one or more embodiments set forth and described herein, a user can, in real-time, conduct a deposit of foreign currency at an ATM, have the foreign currency converted to native currency, and then credited into the financial account Illustrated examples shown in FIGS. 4 through 6 set forth computer-implemented methods 400, 500, 600. In one or more examples, the respective flowcharts of the computer-implemented methods 400, 500, 600 may be implemented by the one or more processors 210 of the one or more financial institution servers 200 and/or the one or more processors 110 of the ATM. In particular, the computer-implemented methods 400, 500, 600 may be implemented as one or more engines in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. In accordance with one or more embodiments set forth, described, and/or illustrated herein, software executed by the ATM 100 and/or one or more financial institution servers 200 provides functionality described or illustrated herein. In particular, software executed by the one or more processors 110 and/or the one or more processors 210 is operable to perform one or more processing blocks of the computer-implemented methods 400, 500, 600 set forth, described, and/or illustrated herein, or provides functionality set forth, described, and/or illustrated. As illustrated in FIG. 4 through 6, the computer-executable program code may instruct the one or more processors 110 and/or the one or more processors 210 to cause a visual display of a Graphical User Interface (GUI) on the user interface 131 of the ATM 100.

As illustrated in FIG. 4, a computer-implemented method can implement receiving and processing of foreign currency. The user inserts his/her ATM card (e.g., debit card) into the ATM and undergo authentication by entering authentication credentials. Upon acceptance of the authentication credentials, the user can then indicate a desire to conduct a deposit of banknotes. In accordance with one or more embodiments, the user need not identify that the banknote(s) includes foreign currency (i.e., non-native banknote(s) relative to the country where the ATM is located, and/or relative to the financial account of the user) as the ATM can automatically detect and identify the origin of each banknote. Alternatively or additionally, the user can specify, in response to a prompt on the user interface of the ATM, that the deposit will include foreign currency. For example, should the ATM be located in the United States, then foreign currency would be considered any banknote that is not U.S. dollars (e.g., Mexican pesos, Brazilian reals, etc.). Should the ATM be located in Canada, then foreign currency would be any currency that is not Canadian dollars (e.g., U.S. dollars, Mexican pesos, etc.). In accordance with one or more embodiments, the ATM facilitates deposits that include foreign currency.

As illustrated in FIG. 4, illustrated process block 402 of computer-implemented method 400 includes capturing (or causing the capture), by a computing device (e.g., ATM 100 and/or financial institution servers 200) in response to entry of a banknote into the ATM, one or more images of at least one surface (e.g., a front surface and/or a rear surface) of the banknote as image data.

The computer-implemented method 400 may then proceed to illustrated process block 404, which includes conducting, by the computing device, image analysis of the captured images.

In accordance with process block 404, conducting the image analysis of the captured image data comprises executing a comparison of the captured image data with stored reference image data. The stored image data may include current or past images of official banknotes of various countries. In that way, the banknote of a particular country of origin is identified. It can also be possible for the ATM to accept, in the same deposit, banknotes of a plurality of different countries.

The computer-implemented method 400 may then proceed to illustrated process block 406, which includes identifying, by the computing device based on the image analysis, all currency types (e.g., native currency and foreign currency associated with the deposited banknote) of each banknote in the deposit.

In accordance with process block 406, identifying the currency type comprises identifying the denomination of the banknote (e.g., whether the banknote is a $5 bill, a $10 bill, etc.). Stored image data of banknotes of different denominations can be utilized to compare to the captured image data of the deposited banknote to determine its denomination. Note that in illustrated process block 406, the deposit can include both foreign currency and native currency (e.g., in a U.S. ATM, both U.S. dollars, Mexican pesos, etc. could be simultaneously deposited).

The computer-implemented method 400 may then proceed to illustrated process block 408, which includes converting, by the computing device, any identified foreign currency to native currency.

In accordance with process block 408, converting any identified foreign currency to native currency comprises determining a current exchange rate for the foreign currency based on stored data and/or wireless communication network data. For example, should foreign currency be deposited at an ATM in the U.S., and is identified as a Canadian dollar, then the current exchange rate between the Canadian dollar and the U.S. dollar is determined using stored data and/or wireless communication network data. Note that exchange rates can vary, and thus, when the current exchange rate is determined, it can be only valid for a predetermined time period (e.g., 60 seconds). Should the deposit not be completed within the time period, an updated exchange rate can be determined and then applied.

The computer-implemented method 400 may then proceed to illustrated process block 410, which includes completing, by the computing device, the deposit by crediting the financial account of the user with the equivalent amount of the foreign currency deposited using native currency for the financial account. For example, should the financial account of the user be established in the United States, the native currency of that financial account is U.S. dollars. Thus, the financial account of the user would be credited with the equivalent amount of the currency deposit in U.S. dollars. Moreover, the exchange rate per unit of banknote is multiplied by the denomination of banknote for that respective exchange rate. For example, should the current exchange rate of Mexican peso to one U.S. dollar be determined as 1:0.059 (i.e., 1 Mexican peso equals $0.059 U.S. dollar), then a banknote having a denomination of 100 Mexican Pesos is exchanged to $5.90 U.S. dollars to be credited to the financial account of the user. Note that typically the value of the banknote deposited would be computed based on the native currency of the financial account of the user (the currency that the financial account of the user generally is based upon).

The computer-implemented method 400 may then proceed to illustrated process block 412, which includes causing, by the computing device, a visual display (e.g., on the user interface of the ATM) of an itemization or summary of the banknote to be deposited in the financial account of the user.

In accordance with process block 412, the itemization includes the identified foreign currency type, and the converted value of the identified foreign currency type based on the detected current exchange rate.

In accordance with process block 412, the visual display includes a confirmation region having one or more user-engageable icons 906, 907 that enable the user to selectively accept or reject the deposited banknote by line-item.

In accordance with process block 412, in response to the user engaging the "accept" icon 906, the computing device may credit the financial account of the user with the deposited banknote. On the other hand, in response to the user engaging the "reject" icon 907, the computing device may not credit the financial account of the user with the deposited banknote. In the illustrated example of FIG. 9, the user can selectively engage the "accept" icon 906 to accept the deposit of banknote identified as Australian dollars and New Zealand dollars, and also selectively engage the "reject" icon 907 to reject the deposit of banknotes in U.S. dollars. The financial account of the user will then be crediting with $135 U.S. dollars and return the $50 U.S. dollars to the user.

As illustrated in FIG. 5, illustrated process block 502 of computer-implemented method 500 includes capturing (or causing the capture), by a computing device (e.g., ATM 100 and/or financial institution servers 200) in response to entry of a banknote into the ATM, one or more images of at least one surface (e.g., a front surface and/or a rear surface) of the banknote as image data.

The computer-implemented method 500 may then proceed to illustrated process block 504, which includes conducting, by the computing device, image analysis of the captured images.

In accordance with process block 504, conducting the image analysis of the captured image data comprises executing a comparison of the captured image data with stored reference image data. The stored image data may include current or past images of official banknotes of various countries. In that way, the banknote of a particular country of origin is identified. It can also be possible for the ATM to accept, in the same deposit, banknote of a plurality of different countries.

The computer-implemented method 500 may then proceed to illustrated process block 506, which includes identifying, by the computing device based on the image analysis, the foreign currency type (e.g., foreign currency associated with the deposited banknote(s)) of any non-native banknotes in the deposit.

In accordance with process block 506, identifying the foreign currency type comprises identifying the denomination of the banknote. Stored image data of banknotes (foreign and native) of different denominations can be utilized to compare to the captured image data of the banknote to determine its denomination. Note that in illustrated process block 506, the deposit can include both foreign currency and native currency (e.g., in a U.S. ATM, both U.S. dollars, Mexican pesos, etc. could be simultaneously deposited), the native currency being automatically detected.

The computer-implemented method 500 may then proceed to illustrated process block 508, which includes converting, by the computing device, any identified foreign currency to native currency.

In accordance with process block 508, converting any identified foreign currency to native currency comprises determining a current exchange rate for the foreign currency based on stored data and/or wireless communication network data. For example, should foreign currency be deposited at an ATM in the U.S., and is identified as a Canadian dollar, then the current exchange rate between the Canadian dollar and the U.S. dollar is determined using stored data and/or wireless communication network data. Note that exchange rates can vary, and thus, when the current exchange rate is determined, it can be only valid for a predetermined time period (e.g., 60 seconds). Should the deposit not be completed within the time period, an updated exchange rate can be determined and then applied.

The computer-implemented method 500 may then proceed to illustrated process block 510, which includes completing, by the computing device, the deposit by crediting the financial account of the user with the equivalent amount of the foreign currency deposited using native currency for the financial account. For example, should the financial account of the user be established in the United States, the native currency of that financial account is U.S. dollars. Thus, the financial account of the user would be credited with the equivalent amount of the currency deposit in U.S. dollars. Moreover, the exchange rate per unit of the deposited banknote is multiplied by the denomination of banknote for that respective exchange rate. For example, should the current exchange rate of Mexican peso to one U.S. dollar be determined as 1:0.059 (i.e., 1 Mexican peso equals $0.059 U.S. dollar), then a banknote having a denomination of 100 Mexican Pesos is exchanged to $5.90 U.S. dollars to be credited to the financial account of the user. Note that typically the value of the banknote deposited would be computed based on the native currency of the financial account of the user (the currency that the financial account of the user generally is based upon).

The computer-implemented method 500 may then proceed to illustrated process block 512, which includes causing, by the computing device, a visual display (e.g., on the user interface of the ATM) of an itemization or summary of the banknote(s) to be deposited in the financial account of the user.

In accordance with process block 512, the itemization includes the identified foreign currency type, and the converted value of the identified foreign currency type based on the detected current exchange rate.

In accordance with process block 512, the visual display includes a confirmation region having one or more user-engageable icons 906, 907 that enable the user to selectively accept or reject each deposited banknote by line-item.

In accordance with process block 512, in response to the user engaging the "accept" icon 906, the computing device may credit the financial account of the user with the deposited banknote. On the other hand, in response to the user engaging the "reject" icon 907, the computing device may not credit the financial account of the user with the deposited banknote. In the illustrated example of FIG. 9, the user can selectively engage the "accept" icon 906 to accept the deposit of banknote identified as Australian dollars and New Zealand dollars, and also selectively engage the "reject" icon 907 to reject the deposit of banknote in U.S. dollars. The financial account of the user will then be crediting with $135 U.S. dollars and return the $50 U.S. dollars to the user.

As illustrated in FIG. 6, illustrated process block 602 of computer-implemented method 600 includes capturing (or causing the capture), by a computing device (e.g., ATM 100 and/or financial institution servers 200) in response to entry of a banknote into the ATM, one or more images of at least one surface (e.g., a front surface and/or a rear surface) of the banknote as image data.

The computer-implemented method 600 may then proceed to illustrated process block 604, which includes identifying, by the computing device based on the image analysis, the foreign currency type (e.g., foreign currency associated with the deposited banknote) of any non-native banknotes in the deposit.

In accordance with process block 604, identifying the foreign currency type comprises conducting, by the computing device, image analysis of the captured images.

In accordance with process block 604, conducting the image analysis of the captured image data comprises executing a comparison of the captured image data with stored reference image data. The stored image data may include current or past images of official banknotes of various countries. In that way, the banknote of a particular country of origin is identified. It can also be possible for the ATM to accept, in the same deposit, banknotes of a plurality of different countries.

In accordance with process block 604, identifying the foreign currency type comprises identifying the denomination of the banknote. Stored image data of banknotes of different denominations can be utilized to compare to the captured image data of the deposited banknote to determine its denomination. Note that in illustrated process block 606, the deposit can include both foreign currency and native currency (e.g., in a U.S. ATM, both U.S. dollars, Mexican pesos, etc. could be simultaneously deposited), the native currency being automatically detected.

The computer-implemented method 600 may then proceed to illustrated process block 606, which includes converting, by the computing device, any identified foreign currency to native currency.

In accordance with process block 606, converting any identified foreign currency to native currency comprises determining a current exchange rate for the foreign currency based on stored data and/or wireless communication network data. For example, should foreign currency be deposited at an ATM in the U.S., and is identified as a Canadian dollar, then the current exchange rate between the Canadian dollar and the U.S. dollar is determined using stored data and/or wireless communication network data. Note that exchange rates can vary, and thus, when the current exchange rate is determined, it can be only valid for a predetermined time period (e.g., 60 seconds). Should the deposit not be completed within the time period, an updated exchange rate can be determined and then applied.

The computer-implemented method 600 may then proceed to illustrated process block 608, which includes completing, by the computing device, the deposit by crediting the financial account of the user with the equivalent amount of the foreign currency deposited using native currency for the financial account. For example, should the financial account of the user be established in the United States, the native currency of that financial account is U.S. dollars. Thus, the financial account of the user would be credited with the equivalent amount of the currency deposit in U.S. dollars. Moreover, the exchange rate per unit of the banknote is multiplied by its denomination for that respective exchange rate. For example, should the current exchange rate of Mexican peso to one U.S. dollar be determined as 1:0.059 (i.e., 1 Mexican peso equals $0.059 U.S. dollar), then a banknote having a denomination of 100 Mexican Pesos is exchanged to $5.90 U.S. dollars to be credited to the financial account of the user. Note that typically the value of the deposited banknote would be computed based on the native currency of the financial account of the user (the currency that the financial account of the user generally is based upon).

The computer-implemented method 600 may then proceed to illustrated process block 610, which includes causing, by the computing device, a visual display (e.g., on the user interface of the ATM) of an itemization or summary of the banknotes to be deposited in the financial account of the user.

In accordance with process block 610, the itemization includes the identified foreign currency type, and the converted value of the identified foreign currency type based on the detected current exchange rate.

In accordance with process block 610, the visual display includes a confirmation region having one or more user-engageable icons 906, 907 that enable the user to selectively accept or reject the deposited banknote by line-item.

In accordance with process block 610, in response to the user engaging the "accept" icon 906, the computing device may credit the financial account of the user with the deposited banknote. On the other hand, in response to the user engaging the "reject" icon 907, the computing device may not credit the financial account of the user with the deposited banknote. In the illustrated example of FIG. 9, the user can selectively engage the "accept" icon 906 to accept the deposit of a banknotes respectively identified as Australian dollars and New Zealand dollars, and also selectively engage the "reject" icon 907 to reject the deposit of a banknote in U.S. dollars. The financial account of the user will then be crediting with $135 U.S. dollars and return the $50 U.S. dollars to the user.

Note that the banknotes deposited at the ATM can comprises a plurality of banknotes of different currency types, and of different denominations.

In accordance with one or more embodiments, each computer-implemented method can be utilized to determine the currency type and denomination of each banknote. For example, a convolutional neural network (or other type of artificial intelligent structure) can be pre-trained using image data of banknotes of different currency types (i.e., foreign and native) and denominations. The computer-implemented method can transmit the captured image data to the neural network, which would then result in a determined currency type and denomination of each banknote. Note that any banknote that cannot be identified, or is identified but determined to be counterfeit or of suspicious origin, would be automatically rejected and returned to the user and not credited.

As illustrated in FIG. 7, an initial interactive session between a user and an ATM, in accordance with one or more embodiments set forth and described herein, is shown. The one or more processors 110 (of the ATM 100) or the one or more processors 210 (of the one or more financial institution servers 200) cause generation of a dashboard 700 for visual display on the UI 131 of the ATM 100. The dashboard 700 includes a plurality of client information and data associated with one or more financial accounts of the user. The dashboard 700 may include a plurality of user-engageable toggles, tiles, switches, tabs, icons, etc. that enable the user to manage one or more financial accounts maintained by the financial institution on behalf of the user. Such management may include, but is not limited to, performing financial transactions. In this regard, the dashboard 700 includes, but is not limited to, an account balance icon 701, a withdrawal icon 702, and a deposit icon 703. Selective engagement of the deposit icon 703 may cause initiation of one of the computer-implemented methods illustrated in FIGS. 4 through 6.

As illustrated in FIG. 8, an interactive session between a user and an ATM enabling deposit of currency, in accordance with one or more embodiments set forth and described herein is shown. The one or more processors 110 (of the ATM 100) or the one or more processors 210 (of the one or more financial institution servers 200) cause generation of a dashboard 800 for visual display on the UI 131 of the ATM 100. The dashboard 800 includes a prompt that instructs the user to insert one or more banknotes therein (e.g., into the currency/banknote acceptor 161). Upon completion of the insertion of banknote(s) associated with the deposit, the user can engage the done icon 804. In response to engagement of the done icon 804 by the user, the one or more processors 110 (of the ATM 100) or the one or more processors 210 (of the one or more financial institution servers 200) causes the visual up the display shown in FIG. 7.

As illustrated in FIG. 9, an interactive session between a user and an ATM during a deposit sequence, in accordance with one or more embodiments set forth and described herein is shown. The one or more processors 110 (of the ATM 100) or the one or more processors 210 (of the one or more financial institution servers 200) cause generation of a dashboard 900 for visual display on the UI 131 of the ATM 100. The dashboard 900 includes, but is not limited to, one or more user-engageable icons 906, 907 that enable the user to selectively accept or reject the deposited banknote by line-item. In response to the user engaging the "accept" icon 906, the one or more processors 110 (of the ATM 100) or the one or more processors 210 (of the one or more financial institution servers 200) may credit the financial account of the user with the deposited banknote. On the other hand, in response to the user engaging the "reject" icon 907, the one or more processors 110 (of the ATM 100) or the one or more processors 210 (of the one or more financial institution servers 200) may not credit the financial account of the user with the deposited banknote. For example, the user can selectively engage the "accept" icon 906 to accept the deposit of banknote respectively identified as Australian dollars and New Zealand dollars, and also selectively engage the "reject" icon 907 to reject the deposit of a banknote in U.S. dollars. The financial account of the user will then be crediting with $135 U.S. dollars and return the $50 U.S. dollars to the user.

In accordance with one or more embodiments set forth, described, and/or illustrated herein, the ATM 100 and the one or more financial institution servers 200 could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software executing on hardware platform, and one or more virtual machines executing on hardware platform by way of virtualization software. Virtualization software is therefore logically interposed between the physical hardware of hardware platform and guest system software executing "in" virtual machine.

Memory of the hardware platform may store virtualization software and guest system software executing in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented engines may be located in a single geographic location (e.g., within a home environment, an office environment, or a server farm). In other example embodiments, the one or more processors or processor-implemented engines may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for a long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in query, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An automated teller machine (ATM), comprising:

a user interface (UI);

a banknote acceptor including a slot and an electric motor to facilitate receipt of banknotes;

one or more optical sensors mounted for movement relative to the banknote acceptor;

one or more processors comprising hardware circuits operatively connected to the one or more optical sensors, the UI, and the electric motor; and a non-transitory memory coupled to the one or more processors, the non-transitory memory including a set of instructions of computer-executable program code, which when executed by the one or more processors, cause the one or more processors to perform operations including:

capturing authentication credentials of a user to authenticate the user as an authenticated user to initiate an active deposit session with the authenticated user;

driving the electric motor to cause the banknote acceptor to receive a banknote from the authenticated user during the active deposit session;

dynamically changing, as the banknote is transported through the slot of the banknote acceptor, a position of the one or more optical sensors relative to the banknote acceptor and causing the one or more optical sensors to capture, as image data, images from different regions of a front surface and a rear surface of the banknote, wherein dynamically changing the position of the one or more optical sensors relative to the banknote acceptor comprises rotating the one or more optical sensors relative to the banknote acceptor about a rotational axis;

receiving, from the optical sensors, the captured image data;

automatically identifying, via a pre-trained neural network based on a comparison of the captured image data with stored reference image data, a currency type and a denomination of the banknote, including whether the banknote corresponds to native currency or foreign currency relative to a user financial account selected for the active deposit session; and rejecting the banknote and driving the electric motor to cause the banknote acceptor to return the banknote to the authenticated user in response to a determination that the native currency or the foreign currency of the banknote cannot be identified, or that the banknote is counterfeit, or that the banknote of is of suspicious origin.

2. The ATM of claim 1, wherein the set of instructions, when executed by the one or more processors, cause the one or more processors to perform operations further including determining, based on stored data and/or wireless communication network data and when the identified currency type is a foreign currency type, a current exchange rate for the foreign currency type.

3. The ATM of claim 2, wherein the set of instructions, when executed by the one or more processors, cause the one or more processors to perform operations further including converting, based on the determined current exchange rate, the identified foreign currency type to a native currency type associated with the user financial account.

4. The ATM of claim 2, wherein the set of instructions, when executed by the one or more processors, cause the one or more processors to perform operations further including displaying, on the UI, one or more user-engageable icons that enable the authenticated user to selectively accept or reject the banknote.

5. The ATM of claim 4, wherein the set of instructions, when executed by the one or more processors, cause the one or more processors to perform operations further including completing the deposit by crediting, in response to the authenticated user accepting the banknote, the user financial account with an amount based on the converted value.

6. The ATM of claim 5, wherein the set of instructions, when executed by the one or more processors, cause the one or more processors to perform operations further including displaying, on the UI, an itemization including the banknote, the identified foreign currency type, and a converted value of the identified foreign currency type based on the determined current exchange rate.

7. The ATM of claim 2, wherein the set of instructions, when executed by the one or more processors, cause the one or more processors to perform operations further including rejecting the banknote and driving the electric motor to cause the banknote acceptor to return the banknote to the authenticated user in response to the authenticated user rejecting the banknote.

8. An automated teller machine (ATM), comprising:

a user interface (UI);

a banknote acceptor including a slot and an electric motor to facilitate receipt of banknotes;

one or more optical sensors mounted for movement relative to the banknote acceptor;

one or more processors comprising hardware circuits operatively connected to the one or more optical sensors, the UI, and the electric motor; and a non-transitory memory coupled to the one or more processors, the non-transitory memory including a set of instructions of computer-executable program code, which when executed by the one or more processors, cause the one or more processors to perform operations including:

driving the electric motor to cause, during an active deposit session with an authenticated user, the banknote acceptor to receive a banknote from the authenticated user during the active deposit session;

causing the one or more optical sensors to capture image data from different regions of a front banknote surface and a rear banknote surface by pivoting the one or more optical sensors relative to the banknote acceptor about a pivot axis to dynamically change a position of the one or more optical sensors relative to the banknote acceptor;

automatically identifying, based on a comparison of the captured image data with stored reference image data, a currency type and a denomination of the banknote, including whether the banknote corresponds to native currency or foreign currency relative to a user financial account selected for the active deposit session; and rejecting the banknote and driving the electric motor to cause the banknote acceptor to return the banknote to the authenticated user in response to a determination that the native currency or the foreign currency of the banknote cannot be identified, or that the banknote is counterfeit, or that the banknote of is of suspicious origin.

9. The ATM of claim 8, wherein the set of instructions, when executed by the one or more processors, cause the one or more processors to perform operations further including determining, based on stored data and/or wireless communication network data and when the identified currency type is a foreign currency type, a current exchange rate for the foreign currency type.

10. The ATM of claim 9, wherein the set of instructions, when executed by the one or more processors, cause the one or more processors to perform operations further including converting, based on the determined current exchange rate, the identified foreign currency type to a native currency type associated with the user financial account.

11. The ATM of claim 9, wherein the set of instructions, when executed by the one or more processors, cause the one or more processors to perform operations further including displaying, on the UI, one or more user-engageable icons that enable the authenticated user to selectively accept or reject the banknote.

12. The ATM of claim 11, wherein the set of instructions, when executed by the one or more processors, cause the one or more processors to perform operations further including completing the deposit by crediting, in response to the authenticated user accepting the banknote, the user financial account with an amount based on the converted value.

13. The ATM of claim 12, wherein the set of instructions, when executed by the one or more processors, cause the one or more processors to perform operations further including displaying, on the UI, an itemization including the banknote, the identified foreign currency type, and a converted value of the identified foreign currency type based on the determined current exchange rate.

14. The ATM of claim 9, wherein the set of instructions, when executed by the one or more processors, cause the one or more processors to perform operations further including rejecting the banknote and driving the electric motor to cause the banknote acceptor to return the banknote to the authenticated user in response to the authenticated user rejecting the banknote.

15. An automated teller machine (ATM), comprising:

a banknote acceptor including a slot and an electric motor to facilitate receipt of one or more banknotes;

one or more optical sensors mounted for movement relative to the banknote acceptor;

one or more processors comprising hardware circuits operatively connected to the one or more optical sensors and the electric motor; and a non-transitory memory coupled to the one or more processors, the non-transitory memory including a set of instructions of computer-executable program code, which when executed by the one or more processors, cause the one or more processors to perform operations including:

driving the electric motor to cause, during an active deposit session with an authenticated user, the banknote acceptor to receive a banknote from the authenticated user during the active deposit session;

causing the one or more optical sensors to capture image data from different surface regions of the banknote by pivoting the one or more optical sensors relative to the banknote acceptor about a pivot axis or rotating the one or more optical sensors relative to the banknote acceptor about a rotational axis to dynamically change a position of the one or more optical sensors relative to the banknote acceptor; and automatically identifying, by comparing the captured image data with stored reference image data, a currency type and a denomination of the banknote, including whether the banknote corresponds to native currency or foreign currency relative to a user financial account selected for the active deposit session.

16. The ATM of claim 15, wherein the set of instructions, when executed by the one or more processors, cause the one or more processors to perform operations further including making a determination, based on the automatic identification, that a determination that the native currency or the foreign currency of the banknote cannot be identified, or that the banknote is counterfeit, or that the banknote of is of suspicious origin.

17. The ATM of claim 16, wherein the set of instructions, when executed by the one or more processors, cause the one or more processors to perform operations further including rejecting the banknote and driving the electric motor, in response to the determination that the native currency or the foreign currency of the banknote cannot be identified, or that the banknote is counterfeit, or that the banknote of is of suspicious origin, to cause the banknote acceptor to return the banknote to the authenticated user.

18. The ATM of claim 15, wherein the set of instructions, when executed by the one or more processors, cause the one or more processors to perform operations further including making a determination, based on the automatic identification, that the native currency or the foreign currency of the banknote can be identified, or that the banknote is not counterfeit, or that the banknote of is not of suspicious origin.

19. The ATM of claim 18, wherein the set of instructions, when executed by the one or more processors, cause the one or more processors to perform operations further including completing the deposit in response to the determination that the native currency or the foreign currency of the banknote can be identified, or that the banknote is not counterfeit, or that the banknote of is not of suspicious origin.

* * * * *